United States Patent [19]

Brandrup-Wognsen et al.

[11] Patent Number: 5,723,177
[45] Date of Patent: Mar. 3, 1998

[54] DIAMOND-IMPREGNATED HARD MATERIAL

[75] Inventors: Helène S. R. Brandrup-Wognsen, Ingarö; Stefan S. O. Ederyd, Saltsjö-Boo, both of Sweden

[73] Assignee: Sandvik AB, Sandviken, Sweden

[21] Appl. No.: 693,663

[22] Filed: Aug. 9, 1996

Related U.S. Application Data

[62] Division of Ser. No. 297,712, Aug. 30, 1994, Pat. No. 5,585,175, and a continuation of Ser. No. 811,527, Dec. 20, 1991, abandoned.

[30] Foreign Application Priority Data

Dec. 21, 1990 [SE] Sweden .................. 9004123

[51] Int. Cl.⁶ .......................................... B05D 7/00
[52] U.S. Cl. ............................... 427/215; 427/212
[58] Field of Search ............................. 427/212, 215

[56] References Cited

U.S. PATENT DOCUMENTS

| | | |
|---|---|---|
| 1,996,598 | 4/1935 | Taylor . |
| 2,411,867 | 12/1946 | Brenner . |
| 2,796,706 | 6/1957 | Anderson . |
| 3,757,878 | 9/1973 | Wilder et al. . |
| 4,124,401 | 11/1978 | Lee et al. . |
| 4,142,869 | 3/1979 | Vereschagin et al. . |
| 4,224,380 | 9/1980 | Bovenkerk et al. . |
| 4,274,840 | 6/1981 | Houseman . |
| 4,288,248 | 9/1981 | Bovenkerk et al. . |
| 4,636,253 | 1/1987 | Nakai et al. . |
| 4,694,918 | 9/1987 | Hall . |
| 4,919,974 | 4/1990 | McCune et al. . |
| 5,010,043 | 4/1991 | Ringwood . |
| 5,011,514 | 4/1991 | Cho et al. . |
| 5,151,107 | 9/1992 | Cho et al. . |

FOREIGN PATENT DOCUMENTS

| | | |
|---|---|---|
| 0012631 | 6/1980 | European Pat. Off. . |
| 0264674 | 4/1988 | European Pat. Off. . |
| 0352811 | 1/1990 | European Pat. Off. . |
| 1482372 | 4/1967 | France . |
| 767 569 | 12/1952 | Germany . |
| 60-043461 | 3/1985 | Japan . |
| 2-208289 | 8/1990 | Japan . |
| 192 637 | 11/1964 | Sweden . |
| 531077 | 12/1940 | United Kingdom . |
| 611860 | 11/1948 | United Kingdom . |

*Primary Examiner*—Archene Turner
*Attorney, Agent, or Firm*—Burns, Doane, Swecker & Mathis, L.L.P.

[57] ABSTRACT

According to the present invention there is provided a wear resistant material consisting of 3–60% by volume of diamond in a matrix containing at least one hard constituent consisting of carbide, nitride and/or carbonitride of one metal of group IV, V and VI in the Periodic Table and a binder phase based upon Co, Ni and/or Fe at which the diamonds are surrounded by a layer >1 μm of refractory metals, carbides, nitrides, oxides, borides or silicides. In this way, a dissolution of diamonds during the sintering is prevented by a special combination of layer material and sintering compaction process.

4 Claims, No Drawings

DIAMOND-IMPREGNATED HARD MATERIAL

This application is a divisional of application Ser. No. 08/297,712, filed Aug. 30, 1994 now U.S. Pat. No. 5,581,175, and a continuation of application Ser. No. 07/811,527, filed Dec. 20, 1991 now abandoned.

BACKGROUND OF THE INVENTION

The present invention relates to a material with diamonds dispersed in a matrix of hard constituents and binder phase and a method of making the same. The material can be used for chip forming machining as well as rock drilling products and wear parts.

Cemented carbide is a material used in industry for a great number of applications as a cutting and wear-resistant material. Cemented carbide consists of hard constituents of WC, TiC, NbC and/or TaC embedded in a binder phase based upon Co, Ni or Fe. The amount of binder phase is typically 5–25% by weight. Cemented carbide is made by powder-metallurgical methods, i.e., milling, pressing and sintering.

A growing group of materials being used essentially for finishing are titanium-based carbonitride alloys, colloquially named cermets. The hard constituent of these alloys is mainly cubic phases of TiC-TiN completely or partly alloyed with other elements such as W, Mo, Ta, Nb, etc. The hard constituents are usually present as more or less rounded particles having a core-rim structure in a binder phase based upon Co, Ni or Fe, usually Ni+Co.

Diamond has, because of its high hardness, been of great interest as an element in wear-resistant materials. Many techniques have been tested for incorporating diamond in a matrix to obtain a dense material. The great problem is, however, the insufficient thermal stability of diamond at high temperatures and normal pressures. High pressure methods have so far been considered necessary to obtain a good result. In general, the diamond is applied as a layer upon a finished substrate usually of cemented carbide in such a process that the diamond does not decompose to graphite, thus losing its good properties.

Diamond layers can also be precipitated on, e.g., cemented carbide at low pressure from gaseous phase by using a gas mixture of hydrogen and a hydrocarbon.

Materials consisting of uncoated diamonds in a cemented carbide matrix are disclosed in a number of older patents. U.S. Pat. No. 1,996,598 discloses a material in which one volume part of diamond particles is embedded in a matrix of 3–4 volume parts of WC-Co in which the Co content is 3–25%. Great Britain Patent No. 611,860 discloses 20–25% by volume of diamond embedded in a matrix of WC and 3–25% Co. Sintering is done under a pressure of 70 kg/cm$^2$ at a temperature of 1350°–1380° C. Great Britain Patent No. 531,077 discloses a matrix of 2.5–5% TiC, 9–15% binder phase and the rest WC. In German Patent No. 767,569 there is described a compound body consisting of a core of diamond-containing matrix of carbides from groups IV, V and VI surrounded by a diamond-free cover of the same composition as the matrix in the core or otherwise. Swedish Patent No. 192,637 discloses a rock drilling insert with >85% WC, <5% other carbides as TiC and TaC, 6–10% binder phase and possible other hard constituents such as diamond.

OBJECTS OF THE INVENTION

An object of the invention is to avoid or alleviate the problems of the prior art.

It is further an object of this invention to provide an improved wear resistant material containing a diamond product having a combination of abrasive and wear resistance of diamond with a high toughness and compressive strength of a matrix material.

SUMMARY OF THE INVENTION

In one aspect of the invention, there is provided a wear resistant material comprising 3–60% by volume of diamond in a matrix containing at least one hard constituent taken from the group consisting of carbide, nitride and carbonitride of at least one metal from groups IV, V and VI of the Periodic Table and a binder phase based upon Co, Ni and/or Fe, the diamond being surrounded by a layer >1 µm thick of at least one refractory material taken from the group consisting of a refractory metal, metal alloy, carbide, nitride, oxide, boride, silicide or combinations thereof.

In another aspect of the invention, there is also provided a method of making a wear resistant material comprising 3–60% by volume of diamonds in a matrix, which matrix contains at least one hard constituent taken from the group consisting of carbide, nitride and carbonitride or mixtures thereof of a metal from group IV, V and VI in the Periodic Table and a binder phase based upon Co, Ni and/or Fe comprising forming a mixture of the said hard consituent, binder phase and diamonds, the diamond being coated with a layer >1 µm of at least one refractory material taken from the group consisting of a refractory metal, carbide, nitride, oxide, boride, silicide or combinations thereof, pressing and sintering the said mixture.

DETAILED DESCRIPTION OF THE PREFERRED EMBODIMENTS OF THE INVENTION

According to the invention, there is now available a material comprising diamond in a matrix containing at least one hard constituent consisting of carbide, nitride and/or carbonitride of at least one metal from group IV, V and/or VI in the Periodic Table and 3–30%, preferably 4–25%, of a binder phase based upon Co, Ni and/or Fe in which the diamonds are surrounded by a layer >1 µm, preferably >2 µm, most preferably 3–15 µm, of a refractory material taken from the group consisting of refractory metals, carbides, nitrides, oxides, borides or silicides. W(WC), TiC, TiN, Al$_2$O$_3$ or their combinations are the preferred materials. By suitable combinations of the compaction/sintering process and choice of coating material, an excellent adherence of diamond to matrix is obtained with little or no decomposition/graphitizing so that a material with high wear resistance is obtained. After an initial decomposition of diamond, a coherent layer of WC, TiCN, etc., next to diamond is formed between the original coating and diamond where it is important to have a correspondence of diamond/layer so that the adherence will be good. The coating of the diamonds is done by known CVD- or PVD-methods, e.g., in a fluidized bed or a rotating drum reactor, by chemical or electrolytic precipitation, etc.

In the obtained product, the excellent toughness and compressive strength of the matrix material is used in combination with the superior abrasive and wear resistance of diamond.

The coated diamonds are mixed with powder of hard constituents and binder-phase, dried, pressed and then sintered, preferably under pressure less than diamond stable pressure, e.g., hot-pressing, or gas-pressure-sintering from which a dense matrix of hard constituents and binder phase with well dispersed diamonds therein is obtained. It is important that the binder-phase is chosen so that sintering to full density can be done at as low temperatures and/or short time as possible. Suitably, a submicron spherical powder with a grain size <1 µm and/or a pre-alloyed powder is at least partly used as raw material for the binder phase. The melting point of the binder may be lowered by adding sintering additives such as boron.

Alternatively, the diamonds are mixed with an earlier dried hard material powder, pressed and sintered. In this case, a network of well-dispersed diamond is obtained in the agglomerate borders.

Another alternative is to mix dried diamond-containing hard material powder with hard material powder, suitably of a different, tougher composition, then press and sinter. An agglomerate of diamond-containing hard material in a tougher matrix is obtained.

According to a further alternative, the diamonds can essentially be present embedded in 10–1000 µm size agglomerates of the refractory material in a matrix of hard constituents and binder phase with or without further diamond.

The diamond powder should suitably have a grain size of 3–100 µm, preferably 5–50 µm. It can consist of one nominal grain size or be a mixture of several ones. In order to obtain the optimum properties in the product of the invention, the diamond content shall not be below 3% by volume at which small improvement of the wear resistance is obtained but not be above 60% by volume at which the toughness is greatly impaired. The diamond content shall preferably be 5–40%, most preferably 10–30%, by volume.

The diamond particles can be natural diamonds or those made by high pressure synthesis. They can also be manufactured through precipitation of diamond by CVD- or PVD-technique in a fluidized bed upon particles of other refractory material according to specification in the European Patent Application EP-A-226898. In this case, coating with the refractory layer according to the invention can suitably be made as a final step in the same reactor.

Cemented carbide material of generally WC-Co type, intended for all kinds of rock-drilling and for wear parts, having a binder phase content of 8–40% by volume and a mean grain size of the hard phase of 1–10 µm are particularly well suited as the matrix for products according to the invention.

For many purposes, it is suitable that the wear-resistant material according to the present invention forms only that part of a hard material body which is most exposed to wear with the remaining part being conventional cemented carbide. Such bodies are often called compound-body and can simply be made by sintering the bodies together according to a method disclosed in the Swedish Patent Application No. 9001409-3. Alternatively, there is a gradient of the diamond content towards the surfaces exposed to wear.

In buttons for rock-drilling, it has also been found suitable to use a powder which is substoichiometric with respect to carbon. In this way, a material with so-called eta-phase is obtained after sintering. If said material then is carburized at a suitably chosen time and temperature, a surface zone free of eta-phase surrounding the eta-phase containing core is obtained. The eta-phase shall be finely distributed, usually with a grain size of 0.5–20 µm, preferably 1–10 µm, and the content of eta-phase shall be at least 2% by volume, preferably at least 10% by volume, but at the most 60% by volume, preferably at the most 35% by volume. The thickness of the eta-phase containing core shall be 10–95%, preferably 30–65%, of the thickness of the button. In a preferred embodiment, the eta-phase-free surface zone of the button has a binder-phase content which is lower, e.g., 0.1–0.9, preferably 0.2–0.7, of the nominal binder-phase content in the surface and which then increases to a maximum, at least 1.2, preferably 1.4–2.5, of the nominal content in the direction towards the eta-phase core.

As material for cutting of non-iron alloys, preferably high-alloyed Al-alloys, there is suitably used as the matrix, a cemented carbide with composition corresponding to the ISO-K10 range or a titanium-based carbonitride alloy.

Material according to the invention is also suitable as a substrate for coating with diamond layer by CVD- or PVD-technique from which the seeding effect from the diamonds in the surface of the substrate is used. The layer grows uniformly and obtains an excellent adherence to the substrate. Suitable coating thickness is <3 mm, preferably 3–300 µm.

The invention is additionally illustrated in connection with the following Examples which are to be considered as illustrative of the present invention. It should be understood, however, that the invention is not limited to the specific details of the Examples.

EXAMPLE 1

Diamond powders with grain size 6–12, 20–30 and 40–60 µm, respectively, were coated with a 5–10 µm thick layer of W, TiC, TiN, $Al_2O_3$, or TiC+$Al_2O_3$, respectively, according to known CVD- or PVD-methods.

EXAMPLE 2

6–12 µm diamond powder with a W-layer from Example 1 was mixed with cemented carbide powder of WC-Co type. The powder had 15% by volume of Co of the type particularly fine-grained grade and the rest WC milled to high sintering activity. The mixture which then contained about 10% by volume of diamond, 13.5% by volume of Co and 76.5% by volume of WC was pressed in an ordinary pressing tool intended for rock-drill buttons. The buttons were hot pressed in an axial press for 15 minutes at 1250° C. at a pressure of 33 MPa. After preparation and examination of the buttons in an optical microscope, it was found that the material was fully dense with the diamonds well distributed in the structure. Between the original w-layer and the diamond surface, a WC layer had been formed being up to 3 µm thick. The diamonds showed no tendency of decomposition.

EXAMPLE 3

Buttons from Example 2 with l=16 mm and φ=11.25 mm were inserted in a φ76 mm bench drill bit and tested in medium hard very abrasive granite with machine ROC 810 with COP 1038 HB.
Results:

|  | Button Diameter | Drilled Meters |  |
| --- | --- | --- | --- |
| Standard 1 | 11 mm | 850 m | worn steel and cemented carbide, 8 regrindings |
| Standard 2 | 12 mm | 930 m | - - - , - - - , - - - |
| According to the invention |  | 1280 m | The butons good but severe steel wash. One light regrinding |

EXAMPLE 4

6–12 μm diamond powder with a W-layer from Example 1 was mixed with a WC-Co powder in such an amount that the diamond content in the powder was about 10% by volume. The mixture was spray-dried and then compacted in an axial press at 1250° C. and a pressure of 33 MPa for 15 minutes. The result was a material with well-dispersed diamonds.

EXAMPLE 5

20–30 μm diamond powder with a W-layer from Example 1 was mixed with a spray dried cemented carbide powder having an agglomerate size of 100–150 μm and the composition of 10% Co, 80% Wc and the rest TiC+TaC+NbC in such an amount that the diamond content in the powder was about 15% by volume. The mixture was then hot pressed in an axial press at 1250° C. and a pressure of 33 MPa for 15 minutes. The result was a material with dense structure having well dispersed diamonds in a network in the agglomerate boundaries.

EXAMPLE 6

20–30 μm diamond powder with a W-layer from Example 1 was mixed with a titanium-based carbonitride powder with approximate composition 16% Co+Ni, 50% Tin+TiC, 15% WC and the rest TaC, VC and Mo$_2$C in such an amount that the diamond content in the powder was about 15% by volume. After spray drying, the powder was mixed with the same amount of powder without diamond but having a binder phase content of about 20%. The mixture was then hot pressed in an axial press at 1250° C. and a pressure of 33 MPa for 15 minutes. The result was a material with dense structure having agglomerates with well dispersed diamonds in a tougher essentially diamond-free matrix.

EXAMPLE 7

6–12 μm diamond powder with a W-layer from Example 1 was mixed with 90% WC, 10% pre-alloyed Co powder in such an amount that the diamond content in the powder was about 10% by volume. The mixture was then compacted in an axial press at 1200° C. and a pressure of 33 MPa for 15 minutes. The result was a material with dense structure having well dispersed diamonds.

EXAMPLE 8

6–12 μm diamond powder with a TiC layer from Example 1 was mixed with 90% WC, 10% pre-alloyed Co powder as well as with 90% WC, 10% Co in such an amount that the diamond content in the powder was about 10% by volume. The mixture was then compacted in an axial press at 1200° C. and a pressure of 33 MPa for 15 minutes. The result was a material with dense structure having well dispersed diamonds.

EXAMPLE 9

6–12 μm diamond powder with a TiN layer from Example 1 was mixed with 90% WC, 10% pre-alloyed Co powder as well as with 90% WC, 10% Co in such an amount that the diamond content in the powder was about 10% by volume. The mixture was then compacted in an axial press at 1200° C. and a pressure of 33 MPa for 15 minutes. The result was a material with dense structure having well dispersed diamonds.

EXAMPLE 10

A diamond layer was precipitated directly upon cutting inserts according to the invention. The nominal composition of the inserts was 6% Co and 94% WC. For comparison also cutting inserts were coated having the same nominal composition but without diamond. These cutting inserts were pre-treated by immersion in an ultrasonic bath with 1 μm diamond slurry during 30 in order to increase the nucleation during the diamond coating.

A CVD-reactor with 1.5 kW microwave plasma with an independent heat stage was used. The coating conditions were as follows:

Gas composition: 2% methane in hydrogen

Pressure: 30 Torr

Gas flow speed: 1000 ml/min.

Furnace temperature: 805° C.

In order to obtain a layer thickness of 8–10 μm a coating time of 12 h was needed for conventional cutting inserts but only 6 h for inserts according to the invention. A microcrystalline coating was obtained.

EXAMPLE 11

Cutting tools according to the invention having a matrix with a composition according to preceding examples with and without diamond layer were tested in continuous longitudinal turning in Al-18 Si alloy and compared with cutting inserts according to prior art. The following data were used:

Speed: 300 m/min.

Feed: 0.3 mm/rev.

Cutting depth: 1.5 mm

Results:

| | | |
|---|---|---|
| Uncoated | 3 minutes | flank wear |
| Coated with 8 μm diamond layer (Example 10) | 20–100 minutes | flaking and flank wear |
| Uncoated insert according to the invention | 10 minutes | flank wear |
| According to the invention with 8 μm diamond layer (Example 10) | 300 minutes | coating worn through, no flaking |

EXAMPLE 12

TiN coated diamonds with about 10–20 μm grain size and a mean layer thickness of 4 μm were mixed with milled spray dried cemented carbide powder of WC-Co type, pressed in an ordinary pressing tool, sintered at 1280° C. for 15 minutes at an applied gas pressure of 150 bar and cooled in a few minutes to below 900° C. and to room temperature in 20 minutes. The buttons which were fully dense and pore free after the sintering and had a uniform structure with the TiN coated diamonds uniformly distributed and no graphite formation could be observed. The hard material body consisted of about 12% by volume of diamonds, 8% by volume of Co binder phase and 80% by volume of WC with a grain size of 2.5–3 μm. The buttons had 9 mm diameter and 13.5 mm length. They were centerless ground with diamond and inserted in drill bits for drifting with diameter 41 mm with 5 buttons per bit and drilled in granite leptite in a test mine.

Machine: Tamrock Minimatic HS 205D
Hammer: HL 538
Results:

| | | | |
|---|---|---|---|
| Standard bit Button 9 mm | 6 regrindings | 380 m | worn cemented carbide |
| Standard bit Button 10 mm | 3 regrindings | 472 m | worn cemented carbide and button damages |
| According to the invention | 1 regrinding | 745 m | worn steel |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of making a wear resistant material comprising 3–60% by volume of diamond particles having a grain size of 3 to 100 µm and uniformly distributed and embedded in a matrix, which matrix contains at least one hard constituent taken from the group consisting of carbide, nitride and carbonitride or mixtures thereof of a metal from group IV, V and VI in the Periodic Table and a binder phase based upon Co, Ni and/or Fe, the method comprising forming a mixture of said hard constituent, binder phase and the diamond particles, each of the diamond particles being coated with a layer >1 µm of at least one refractory material taken from the group consisting of a refractory metal, carbide, nitride, oxide, boride, silicide or combinations thereof, pressing and sintering said mixture.

2. A method according to claim 1, wherein the wear resistant material comprises 5–40% by volume of the diamond particles.

3. The method according to claim 1, wherein the the diamond particles are coated with a layer >2 µm of said refractory material.

4. The method according to claim 1, wherein at least a portion of the binder phase is a spherical powder with a grain size <1 µm.

* * * * *